United States Patent
Asao et al.

(10) Patent No.: US 7,485,983 B2
(45) Date of Patent: Feb. 3, 2009

(54) VEHICLE POWER SUPPLY SYSTEM

(75) Inventors: Yoshihito Asao, Tokyo (JP); Yutaka Kitamura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 479 days.

(21) Appl. No.: 10/809,870

(22) Filed: Mar. 26, 2004

(65) Prior Publication Data

US 2004/0251858 A1 Dec. 16, 2004

(30) Foreign Application Priority Data

Mar. 28, 2003 (JP) ............................. P2003-089445

(51) Int. Cl.
 *B60L 1/00* (2006.01)
 *G05F 3/06* (2006.01)
(52) U.S. Cl. ...................................... 307/10.1; 307/151
(58) Field of Classification Search .............. 307/10.1, 307/150, 151
See application file for complete search history.

(56) References Cited

U.S. PATENT DOCUMENTS

| | | | | |
|---|---|---|---|---|
| 4,535,863 A * | 8/1985 | Becker | | 180/68.5 |
| 6,188,574 B1 | 2/2001 | Anazawa | | |
| 6,462,961 B1 * | 10/2002 | Johnson et al. | | 361/825 |
| 6,621,701 B2 * | 9/2003 | Tamba et al. | | 361/699 |
| 6,799,993 B2 * | 10/2004 | Krieger et al. | | 439/500 |
| 6,843,335 B2 * | 1/2005 | Shirakawa et al. | | 180/65.1 |
| 2004/0211613 A1 * | 10/2004 | Asao et al. | | 180/291 |

FOREIGN PATENT DOCUMENTS

| | | |
|---|---|---|
| EP | 1 034 968 A1 | 9/2000 |
| EP | 1 266 801 A2 | 12/2002 |
| JP | 07-007810 A | 1/1995 |
| JP | 7-89355 A | 4/1995 |
| JP | 11-180163 A | 7/1999 |
| JP | 2001-023700 A | 1/2001 |
| JP | 2002-067705 A | 3/2002 |
| JP | 2003-079003 A | 3/2003 |
| JP | 2003-100272 A | 4/2003 |
| JP | 2004-025934 A | 1/2004 |
| JP | 2004-120936 A | 4/2004 |
| JP | 2004-148852 A | 5/2004 |
| WO | WO 98/36489 A1 | 8/1998 |

OTHER PUBLICATIONS

J. Ishii et al., "Inverter with a New Cooling Apparatus by Boiling and Condensation", International Electric Vehicle Symposium, published Oct. 13, 1996, pp. 567-573 with Abstract.

* cited by examiner

*Primary Examiner*—Michael J Sherry
*Assistant Examiner*—Michael Rutland Wallis
(74) *Attorney, Agent, or Firm*—Sughrue Mion, PLLC (57) ABSTRACT

In a vehicle power supply system including a battery, an inverter unit for converting DC electric power of the battery into AC electric power and supplying it to a rotating electric machine to drive it, an AC wiring line for connecting the rotating electric machine and the inverter unit, and a DC wiring line for connecting the inverter unit and the battery, the inverter unit is placed in a vicinity of the battery so that the DC wiring line becomes shorter than the AC wiring line. By this, a voltage drop due to the DC wiring line is reduced, and a torque characteristic of the rotating electric machine can be improved.

2 Claims, 9 Drawing Sheets

VEHICLE POWER SUPPLY SYSTEM

BACKGROUND OF THE INVENTION

1. Field of the Invention

The present invention relates to a vehicle power supply system, and particularly to a positional relation between an inverter unit for controlling a rotating electric machine mounted in an electric vehicle, a hybrid vehicle or the like and a battery, and to a vehicle power supply system which can improve a torque characteristic of the rotating electric machine.

2. Description of the Related Art

Against the backdrop of the prevention of global warming, emission reduction of $CO_2$ has been requested.

The reduction of $CO_2$ in a vehicle means an improvement in fuel consumption performance, and as one of solutions thereto, the development and practical application of an electric vehicle (EV) or a hybrid vehicle (HEV) has been pursued.

Here, especially, functions required for a rotating electric machine mounted in a hybrid vehicle include idling stop at the time of stop of a vehicle, energy regeneration during deceleration running, torque assistance during acceleration running, and the like, and the improvement in fuel consumption performance is enabled by realizing these.

For example, as disclosed in JP-A-7-89355, the related art has such a structure that a control unit including an inverter for driving a rotating electric machine is mounted in an engine room, and a battery is mounted in a rear compartment of a vehicle.

In the structure as stated above, there have been problems that a DC wiring line for connecting the battery and the control unit including the inverter becomes long, so that a voltage drop in the DC wiring line becomes large, and in order to obtain both a desired torque and a desired rotation speed in the rotating electric machine, there occurs such a situation eventually that a battery voltage must be made high, and a large increase in cost and an increase in weight are caused.

SUMMARY OF THE INVENTION

The present invention has been made to solve the problems as described above, and an object thereof is to provide a vehicle power supply system which can improve a torque characteristic of a rotating electric machine, is light in weight, and is inexpensive.

A vehicle power supply system according to this invention includes a battery, an inverter unit for converting DC electric power of the battery into AC electric power and supplying it to a rotating electric machine to drive it, an AC wiring line for connecting the rotating electric machine and the inverter unit, and a DC wiring line for connecting the inverter unit and the battery, in which the inverter unit is placed in a vicinity of the battery so that the DC wiring line becomes shorter than the AC wiring line.

By this, it becomes possible to reduce a voltage drop due to the DC wiring line, and it is possible to improve the torque characteristic of the rotating electric machine and to realize the lightweight and inexpensive vehicle power supply system.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
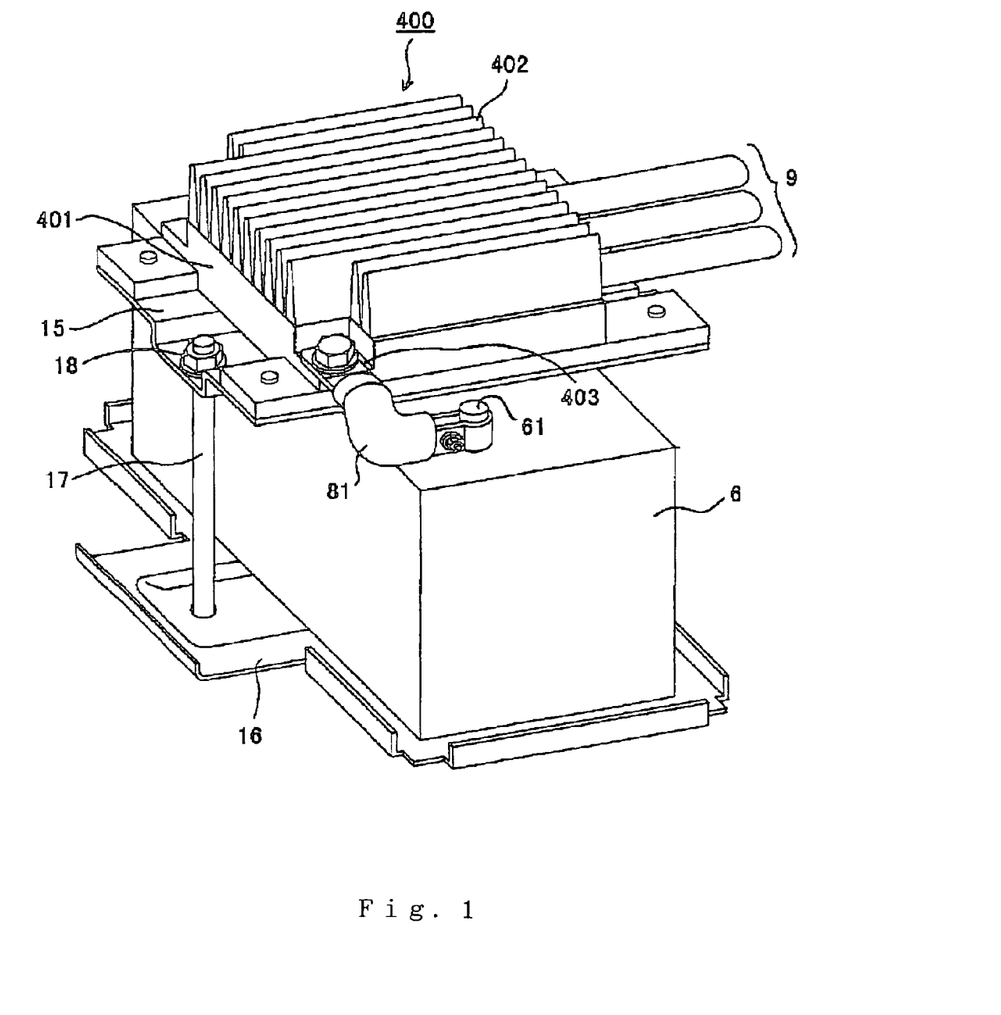
FIG. 1 is a perspective view showing an apparatus structure in embodiment 1 of this invention.
Figure 2:
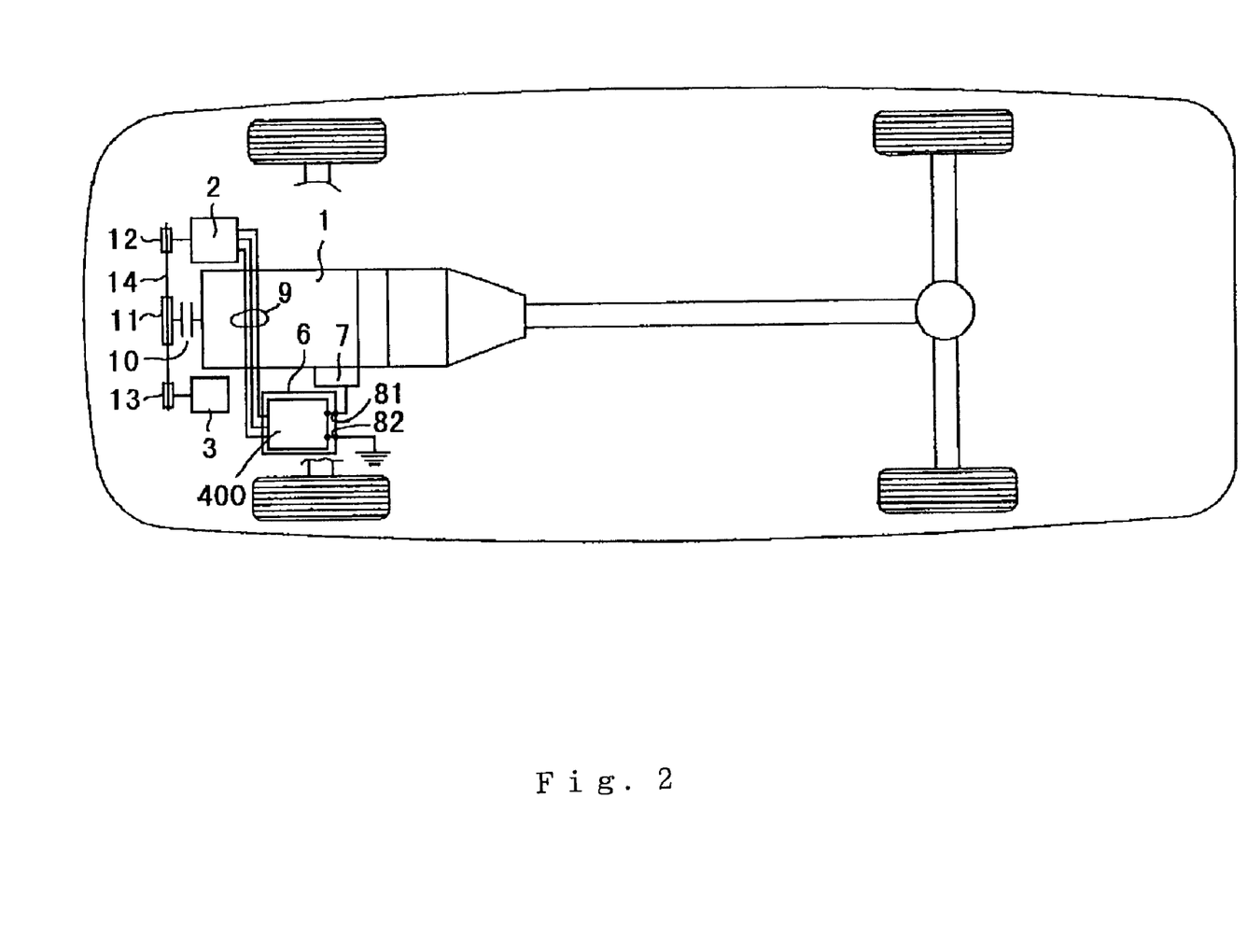
FIG. 2 is a conceptual view showing an arrangement relation of the whole of a vehicle in the embodiment 1 of this invention.
Figure 3:
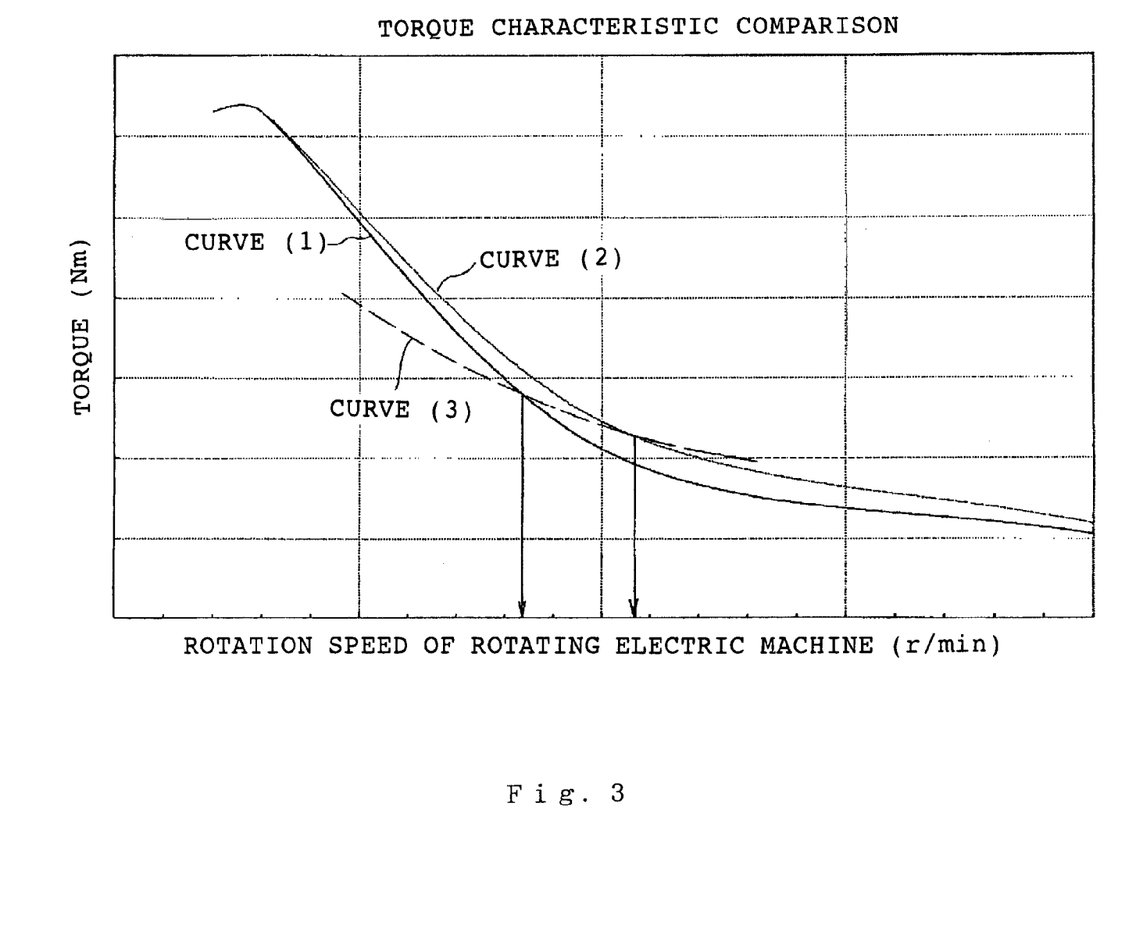
FIG. 3 is a curve view showing a torque characteristic of a rotating electric machine in the embodiment 1 of this invention.

Embodiment 1 of this invention will be described with reference to FIGS. 1 to 3. FIG. 1 is a perspective view showing a structure in the embodiment 1. FIG. 2 is a conceptual view showing an arrangement relation of the whole of a vehicle in the embodiment 1. FIG. 3 is a curve view showing a torque characteristic of a rotating electric machine in the embodiment 1.

FIG. 3 shows an example of comparison between a torque characteristic of a rotating electric machine 2 at the time when an attachment structure of an inverter unit of the embodiment 1 of this invention is adopted and a torque characteristic at the time when a 12V battery is used instead of a high voltage battery in a conventional hybrid vehicle, and simultaneously shows a load torque characteristic of an engine in terms of rotation speed of the rotating electric machine, and intersection points with the respective torque characteristics indicate points of cranking rotation speeds at the time of starting.

In FIG. 1, an inverter unit (having no built-in DC-DC converter) 400 includes an inverter unit main body 401 having a not-shown built-in inverter module part and control part, and a radiating fin 402 for radiating heat mainly generated in the inverter module part, and a positive terminal 403 provided at the inverter unit main body 401 is electrically connected to a positive terminal 61 of a 12V battery 6 by a positive DC wiring line 81.

Besides, similarly, a negative terminal 404 (not shown) provided at the inverter unit main body 401 is electrically connected to a negative terminal 62 (not shown) of the 12V battery 6 by a negative DC wiring line 82 (not shown).

Incidentally, it is assumed that the negative terminal 62 of the 12V battery 6 is earthed to the body of a vehicle by a different wiring line.

One end of a three-phase AC wiring line 9 is connected to a three-phase terminal (not shown) provided at the inverter unit main body 401, and the other end is connected to a corresponding three-phase terminal of the rotating electric machine 2.

The inverter unit 400 is screwed to a battery fixing plate 15, this battery fixing plate 15 is clamped and fixed to a battery tray 16 by an attachment bolt 17 and a nut 18 at least two places in a state where the 12V battery 6 is held therebetween, and the battery tray 16 is fixed to the body of the vehicle at a not-shown portion.

Accordingly, the inverter unit 400 is fixed at the upper end face of the 12V battery 6 with respect to the body of the vehicle through the battery fixing plate 15, the attachment bolt 17, the nut 18, the 12V battery 6 and the battery tray 16.

In the attachment structure of the inverter unit as stated above, since the inverter unit is integrally attached to the upper end face of the battery, when a space for the attachment of the inverter unit is merely ensured at the upper end of the battery, it becomes possible to simultaneously mount the inverter unit and the battery in an engine room.

Further, as is understood from FIG. 1 as well, since the length of the positive DC wiring line 81 for electrically connecting the battery and the inverter unit and the length of the negative DC wiring line 82 become minimum, the voltage drop due to the wiring resistance can also be suppressed to be minimum.

In FIG. 2, the rotating electric machine 2 is a winding field synchronous motor. The DC electric power supplied to the inverter unit 400 through the DC wiring lines 81 and 82 from the 12V battery 6 is converted into three-phase AC electric power by the inverter unit 400, and the three-phase AC electric power is supplied to the rotating electric machine 2 through the three-phase AC wiring line 9 so that it is operated.

The rotating motive power of the rotating electric machine 2 operated as stated above is transmitted from a pulley 12 for a rotating electric machine through a belt 14 to a crank pulley 11 and a pulley 13 for an auxiliary machine.

Here, a clutch device 10 placed between the crank shaft of an engine 1 and the crank pulley 11 transmits, when it is on (coupled), the rotating motive power from the rotating electric machine 2 to the engine 1, or transmits the rotating motive power from the engine 1 to the rotating electric machine 2 and an auxiliary machine 3 through the crank pulley 11 and the belt 14. However, when the clutch device is off (uncoupled), it mutually cuts off the delivery of the motive power between the crank pulley 11 and the engine 1.

Electric loads mounted in the vehicle are also fed from the 12V battery 6, and a starter 7 is also fed from the 12V battery 6 and is operated.

Next, to what degree the torque characteristic of the rotating electric machine 2 is improved by reducing the wiring resistance between the battery and the inverter unit as stated above, and to what degree the cranking rotation speed by the rotating electric machine 2 at the time of starting of the engine is improved by the improvement of the torque characteristic, will be described with reference to a comparison example of the torque characteristic of FIG. 3.

In the graph of FIG. 3, the horizontal axis indicates the rotation speed of the rotating electric machine, and the vertical axis indicates the generated torque value at the respective rotation speed.

Here, a curved line (1) indicates a torque characteristic of a conventional long DC wiring line, and a curved line (2) indicates a torque characteristic of the embodiment 1 according to this invention in which the wiring resistance is reduced so that the wiring resistance including the internal resistance of the battery becomes almost half as compared with the conventional wiring line.

A curved line (3) indicates a load torque characteristic of a certain engine, and intersection points between this curved line (3) and the curved line (1)/the curved line (2) indicate cranking rotation speeds (FIG. 3 shows the rotation speed of the rotating electric machine at the time of cranking) of the engine by the rotating electric machine at the respective torque characteristics.

In the case of FIG. 3, as compared with the conventional DC wiring line, the wiring resistance including the internal resistance of the battery is reduced to be almost half, and there is an effect that the cranking rotation speed can be increased by above 25%.

This embodiment 1 includes structures as set forth in following items (1) and (2), and the respective structures have operations and effects as set forth in the items (1) and (2).

(1) A vehicle power supply system includes a battery, a rotating electric machine which is connected to an engine, is driven, at a time of starting of an engine, by electric power of the battery to start the engine, and is driven, after the starting of the engine, by the engine to generate AC electric power, an inverter unit which converts, at the time of starting of the engine, the DC electric power of the battery into AC electric power and supplies it to the rotating electric machine to drive it, and converts, after the starting of the engine, AC electric power generated by the rotating electric machine into DC electric power and charges the battery, an AC wiring line for connecting the rotating electric machine and the inverter unit, and a DC wiring line for connecting the inverter unit and the battery, and is characterized in that the inverter unit is placed in the vicinity of the battery.

Effects (1A) The inverter unit is placed in the vicinity of the battery, so that the DC wiring line for connecting the inverter unit and the battery is shortened, and the voltage drop due to the DC wiring line can be made minimum, and accordingly, the torque characteristic of the rotating electric machine can be improved, and both the desired torque and the desired rotation speed can be obtained simultaneously without causing the battery for the rotating electric machine to have high voltage.

Accordingly, it is not necessary to provide two kinds of batteries, that is, a 12V battery for a general electric load and a high voltage battery for a rotating electric machine, and a long DC wiring line, and further it is not necessary to additionally provide a DC-DC converter and the like, and accordingly, there is an effect that a large increase in cost and increase in weight can be avoided.

(2) The vehicle power supply system as set forth in the item (1) is characterized in that the inverter unit is integrally fixed to an upper end face of the battery.

Effects

There are the same effect (1A) as the above item (1) and following effects.

(2A) Since the attachment structure is such that the inverter unit is placed above the battery, even in the case where there is no planar space in which it is placed beside the battery, it can be placed when there is a space above the battery, and the layout properties are excellent.

(2B) Besides, since a terminal of a battery is generally positioned at an upper part, the distance to the terminal of the inverter unit becomes shortest, and the wiring resistance of the DC wiring line for connecting the battery and the inverter unit can be almost neglected.

(2C) In the case of a vehicle, since a battery is generally disposed at an upper part in an engine room, in the case where the inverter unit is placed further above the battery, it is possible to prevent the inverter unit from being sprinkled with water from the lower part of the vehicle.

(2D) Since the inverter unit is fixed integrally with the battery, it is possible to prevent the inverter unit and the battery from performing separate movements to the vibration from the outside, and accordingly, it is possible to prevent excessive stress from being applied to the DC wiring line for connecting the inverter unit and the battery, and a disadvantage such as the snapping of a wire can be prevented.

According to the embodiment 1 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the DC wiring lines 81 and 82 for connecting the inverter unit 400 and the battery 6, in order to make the DC wiring lines 81 and 82 shorter than the AC wiring line 9, the inverter unit 400 is fixed to the attachment member composed of the battery fixing plate 15 for mounting the battery 6 to the vehicle main body and the battery tray 16, so that the inverter unit 400 is integrally fixed to the upper end face of the battery 6 and the inverter unit 400 is placed in the vicinity of the battery 6. The inverter unit is integrally fixed to the upper end face of the battery, so that the inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, and has the lightweight and inexpensive structure.

Embodiment 2

Figure 4:
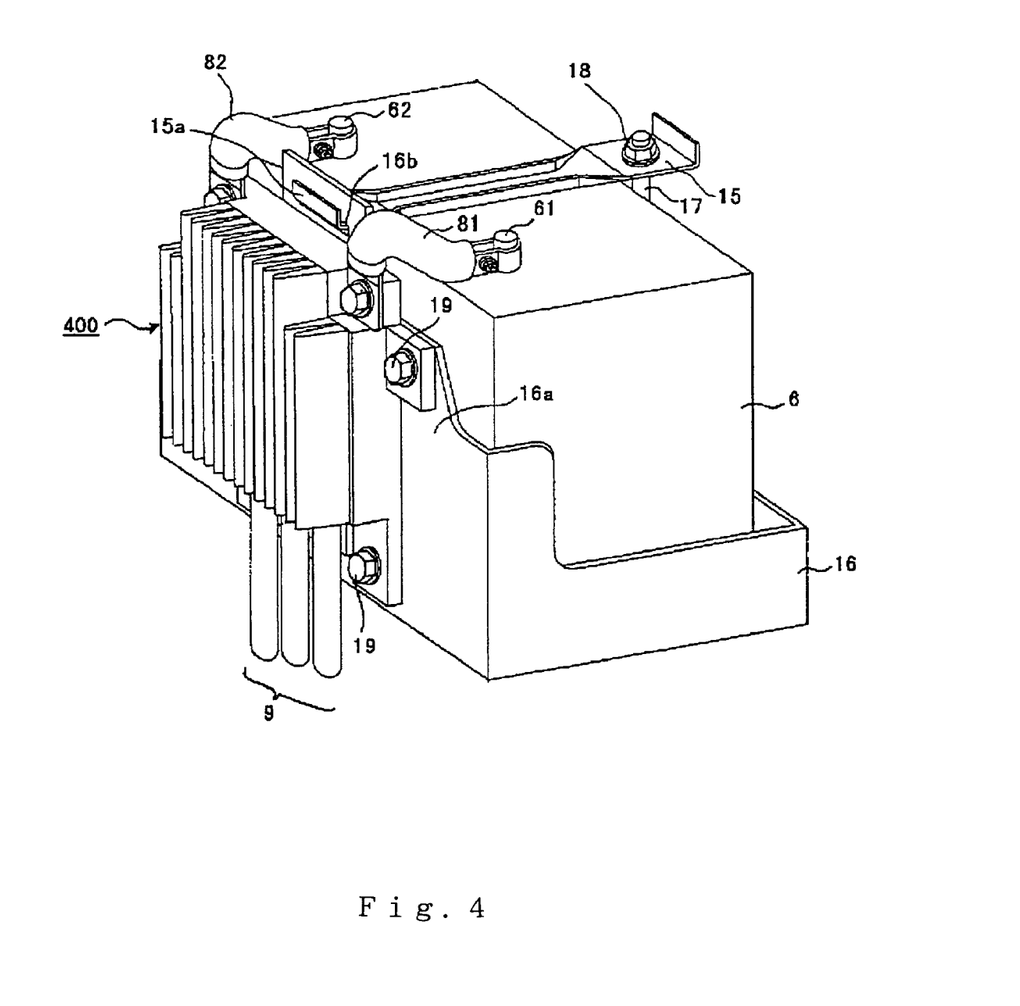
FIG. 4 is a perspective view showing an apparatus structure in embodiment 2 of this invention.

Embodiment 2 of this invention will be described with reference to FIG. 4. FIG. 4 is a perspective view showing a structure of the embodiment 2.

Except for a specific structure described here, the embodiment 2 has the same structure as the structure of the embodiment 1 described before and has the same operation. In the drawing, the same signs denote the same or equivalent portions.

In FIG. 4, one side end face 16*a* of a battery tray 16 is high like a wall along a side end face of a 12V battery 6, and an inverter unit 400 is attached to the side end face 16*a* by a bolt 19 in a vertically placed state.

The 12V battery 6 is clamped and fixed by a nut 18 through an attachment bolt 17 in such a state that it is held between a battery fixing plate 15 having one L-shaped portion 15*a* inserted and fixed to a slit-shaped hole 16*b* provided above the side end face 16*a* of the battery tray 16 and a bottom of the battery tray 16.

At this time, since the battery tray 16 is fixed to a body of a vehicle at a not-shown portion, the inverter unit 400 and the 12V battery 6 are fixed to the body of the vehicle through the battery tray 16.

Incidentally, the other structure is constructed similarly to the embodiment 1.

In the attachment structure of the inverter unit of the embodiment 1, although the structure is such that the inverter unit is integrally attached to the upper end face of the battery, the attachment structure of the inverter unit according to this embodiment 2 is such that the inverter unit is attached to the side of the battery.

That is, since the structure is such that the inverter unit is vertically placed and is integrally attached to the side of the battery, there is a merit that a planar space may be smaller than the case where the inverter unit is attached on a plane.

This embodiment 2 has structures as set forth in following items (3) and (4), and the respective structures have operations and effects as set forth in the items (3) and (4).

(3) The vehicle power supply system as set forth in the item (1) or (2) is characterized in that the inverter unit is integrally fixed to the side of the battery.

Effects

There are the same effects as the items (1) and (2) in the embodiment 1 and following effects.

(3A) Since the attachment structure is such that the inverter unit is placed on the side of the battery, even in the case where there is no planar space in which it is placed beside the battery, it can be placed when there is a space of the side of the battery, and the layout properties are excellent.

(3B) Besides, the distance between the terminal of the battery and the terminal of the inverter unit becomes shortest, and the wiring resistance of the DC wiring line for connecting the battery and the inverter unit can be almost neglected.

(3C) In the case of a vehicle, since a battery is generally disposed at an upper part in an engine room, in the case where the inverter unit is placed at the side of the battery, it is possible to prevent the inverter unit from being sprinkled with water from the lower part of the vehicle.

(3D) Since the inverter unit is fixed integrally with the battery, it is possible to prevent the inverter unit and the battery from performing separate movements to vibration from the outside, and therefore, it is possible to prevent excessive stress from being applied to the DC wiring line for connecting the inverter unit and the battery, and a disadvantage such as the snapping of a wire can be prevented.

(4) The vehicle power supply system as set forth in one of the items (2) and (3) is characterized in that the inverter unit is fixed to a housing for holding the battery.

Effects (4A) Since the inverter unit is fixed integrally with the battery through the housing for holding the battery, it is possible to prevent the inverter unit and the battery from performing separate movements to vibration from the outside, and therefore, it is possible to prevent excessive stress from being applied to the DC wiring line for connecting the inverter unit and the battery, and a disadvantage such as the snapping of a wire can be prevented.

(4B) Since the housing for holding the battery has a relatively high degree of freedom in designing, it is easy to adapt for the attachment structure for fixing the inverter unit.

(4C) Since the inverter unit is directly attached to the housing for holding the battery, the housing functions as a radiating fin.

According to the embodiment 2 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the DC wiring lines 81 and 82 for connecting the inverter unit 400 and the battery 6, the inverter unit 400 is placed in the vicinity of the battery 6 so that the DC wiring lines 81 and 82 become shorter than the AC wiring line 9, and the inverter unit 400 is integrally fixed to the side of the battery. The inverter unit is integrally fixed to the side of the battery 6, so that the inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, and has the lightweight and inexpensive structure.

Besides, according to the embodiment 2 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the DC wiring lines 81 and 82 for connecting the inverter unit 400 and the battery 6, the inverter unit 400 is placed in the vicinity of the battery 6 so that the DC wiring lines 81 and 82 become shorter than the AC wiring line 9, and the inverter unit 400 is fixed to the housing composed of the battery tray 16 for holding the battery 6. The inverter unit is fixed to the housing for holding the battery, so that the inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, and has the lightweight and inexpensive structure.

Embodiment 3

Figure 5:
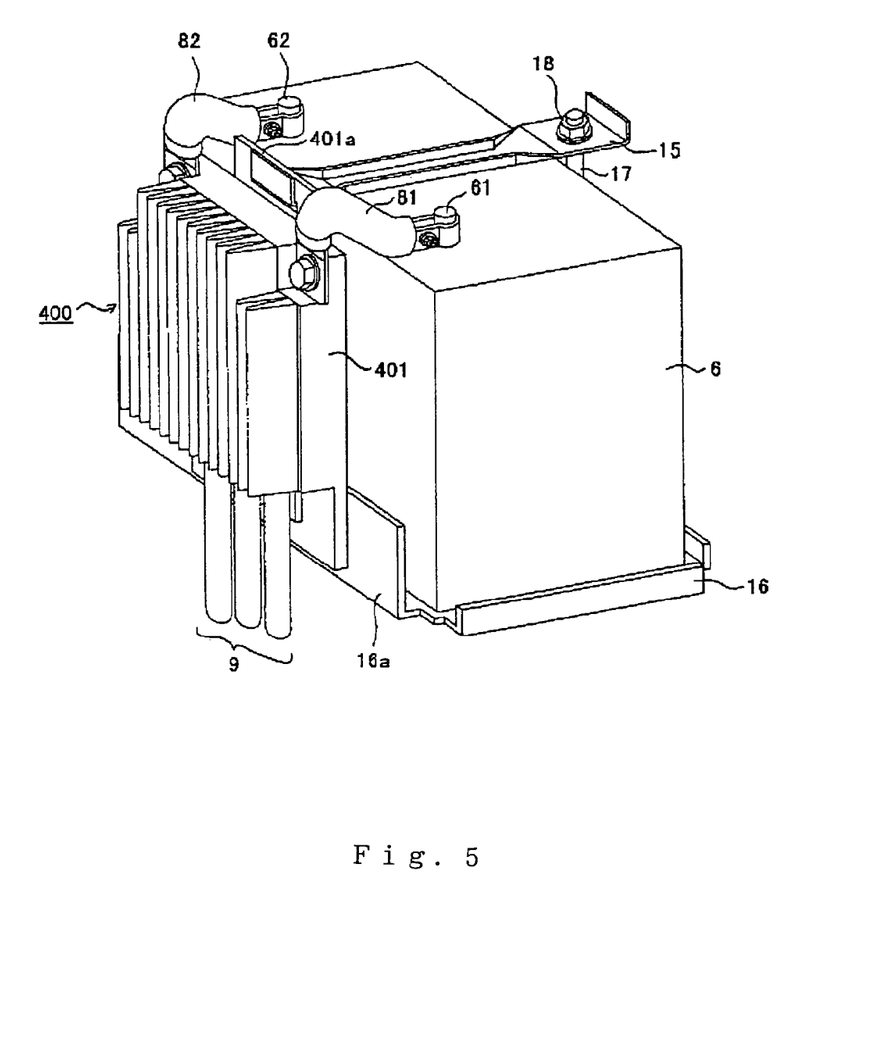
FIG. 5 is a perspective view showing an apparatus structure in embodiment 3 of this invention.

Embodiment 3 of this invention will be described with reference to FIG. 5. FIG. 5 is a perspective view showing a structure of the embodiment 3.

Except for a specific structure described here, the embodiment 3 has the same structure as the structure of the embodiment 1 described before and has the same operation. In the drawing, the same signs denote the same or equivalent portions.

In FIG. 5, a battery fixing plate 15 is integrally fixed by welding or caulking to an upper side of an attachment plate 401*a* fixed integrally with an inverter unit main body 401 of an inverter unit 400 and constituting a part of the inverter unit 401, while a not-shown L-shaped pawl is formed at an under side of the attachment plate 401*a*, and is inserted and fixed to a not-shown slit-shaped hole provided at a side end face 16*a* of a battery tray 16.

Then, a 12V battery 6 is clamped and fixed by a nut 18 through an attachment bolt 17 in such a state that it is held between the battery fixing plate 15 integrally fixed to the attachment plate 401*a* and a bottom of the battery tray 16.

At this time, since the battery tray 16 is fixed to a body of a vehicle at a not-shown portion, the inverter unit 400 and the 12V battery 6 are fixed to the body of the vehicle through the battery tray 16.

Since the attachment structure of the inverter unit according to this embodiment 3 is such that the part of the housing of the inverter unit 400 also functions as the battery fixing plate for fixing the 12V battery 6, there is a merit that it is possible to easily perform the work of attaching and fixing the inverter unit 400 to the 12V battery 6 as one unit.

This embodiment 3 has a structure as set forth in following item (5), and has an operation and effect as set forth in the item (5).

(5) The vehicle power supply system as set forth in one of the items (2) and (3) is characterized in that the housing of the inverter unit has also the function of the housing for holding the battery.

Effects (5A) Since the housing of the inverter unit has the function of the housing for holding the battery, the inverter unit can be fixed integrally with the battery, and it is possible to prevent the inverter unit and the battery from performing separate movements to vibration from the outside, and therefore, it is possible to prevent excessive stress from being applied to the DC wiring line for connecting the inverter unit and the battery, and a disadvantage such as the snapping of a wire can be prevented.

(5B) Since the housing of the inverter unit has the function of the housing for holding the battery, the inverter can be fixed to the battery simultaneously by holding and fixing the battery by the housing of the inverter unit, and therefore, the attachment work becomes easy.

According to this embodiment 3 of the invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the DC wiring lines 81 and 82 for connecting the inverter unit 400 and the battery 6, the inverter unit 400 is placed in the vicinity of the battery 6 so that the DC wiring lines 81 and 82 become shorter than the AC wiring line 9, and the housing of the inverter unit 400 is made to have also the function of the housing for holding the battery 6. The housing of the inverter unit is made to have also the function of the housing for holding the battery, the inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, and is lightweight and inexpensive.

Embodiment 4

Figure 6:
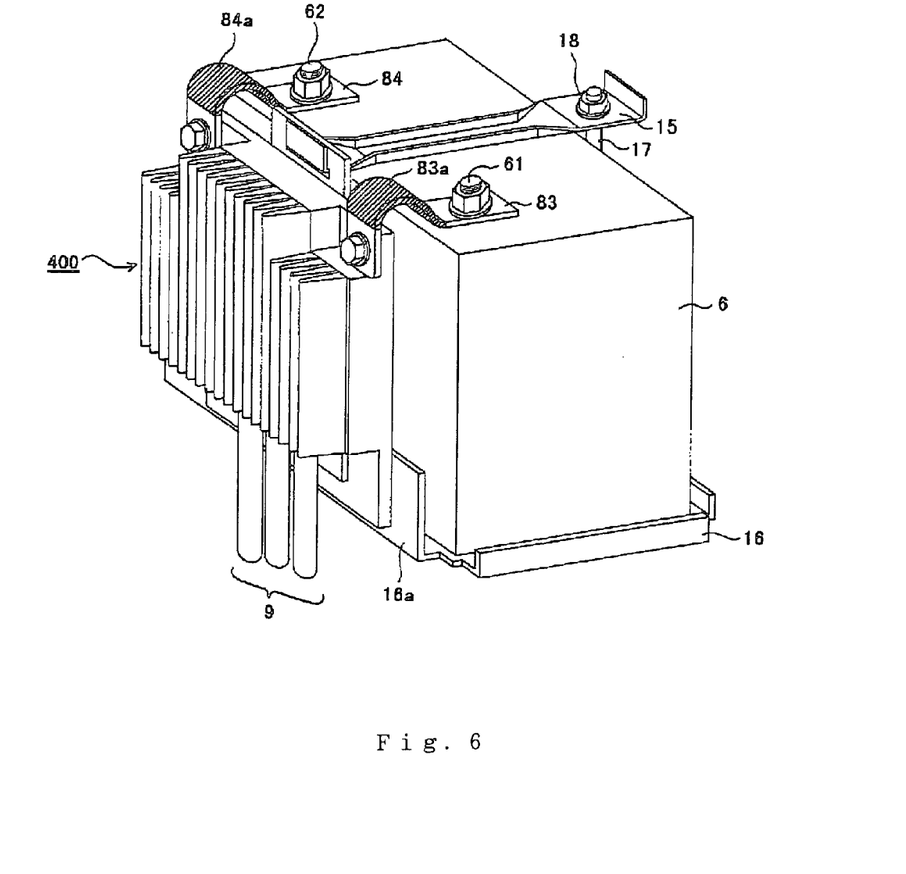
FIG. 6 is a perspective view showing an apparatus structure in embodiment 4 of this invention.

Embodiment 4 of this invention will be described with reference to FIG. 6. FIG. 6 is a perspective view showing a structure according to the embodiment 4.

Except for a specific structure described here, the embodiment 4 has the same structure as the structure of the embodiment 1 and the embodiment 3 described before and has the same operation. In the drawing, the same signs denote the same or equivalent portions.

FIG. 6 is a view showing an attachment structure of an inverter unit of this embodiment 4.

As compared with the foregoing embodiment 3, in the embodiment 4 of FIG. 6, both a positive DC conduction plate 83 and a negative DC conduction plate 84 are formed of plate-shaped good conductive members having a specific level of strength, and have the function of a DC wiring line for electrically connecting an inverter unit 400 and a 12V battery 6, and the function of attaching and fixing the inverter unit 400 to the 12V battery 6.

Incidentally, insulating members 83*a* and 84*a* for electrical insulation and corrosion prevention are provided on the surfaces of intermediate parts of the positive conduction plate 83 and the negative conduction plate 84.

In the attachment structure of the inverter unit according to this embodiment 4, since the DC wiring lines for electrically connecting the inverter unit 400 and the 12V battery 6 are formed of the plate-shaped good conductive members having the specific level of strength, there are merits that the wiring connection work becomes easy, and the inverter unit 400 can be firmly fixed to the 12V battery 6.

This embodiment 4 has structures as set forth in following items (6) and (7) and has operations and effects as set forth in the items (6) and (7).

(6) The vehicle power supply system as set forth in any one of the items (1) to (5) is characterized in that the electric connection body for electrically connecting the battery and the inverter unit is a metal plate.

Effects (6A) The DC wiring line for electrically connecting the battery and the inverter unit is constructed by the metal plate, so that the metal plate can be formed into a shape to connect the battery terminal and the terminal of the inverter unit, and therefore, the positioning at the time of wire connection becomes easy.

(7) The vehicle power supply system as set forth in the item (6) is characterized in that the electric connection body for electrically connecting the battery and the inverter unit is made to have the function of holding and fixing the inverter unit to the battery.

Effects (7A) Since the electric connection body for electrically connecting the battery and the inverter unit is made to have the function of holding and fixing the inverter unit to the battery, the inverter unit can be further certainly fixed to the battery.

According to the embodiment 4 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the positive and negative DC conduction plates 83 and 84 for connecting the inverter unit 400 and the battery 6, the inverter unit 400 is placed in the vicinity of the battery 6 so that the positive and negative DC conduction plates 83 and 84 become shorter than the AC wiring line 9, and the positive and negative DC conduction plates 83 and 84 for electrically connecting the battery 6 and the inverter unit 400 are the metal plates. The inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, and has the lightweight and inexpensive structure, and in which the positioning at the time of wire connection between the battery and the inverter unit can be easily perform.

Besides, according to the embodiment 4 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the positive and negative DC conduction plates 83 and 84 for connecting the inverter unit 400 and the battery 6, the inverter unit 400 is placed in the vicinity of the battery 6 so that the positive and negative DC conduction plates 83 and 84 become shorter than the AC wiring line 9, and the inverter unit is held and fixed to the battery by the positive and negative DC conduction plates 83 and 84 for electrically connecting the battery 6 and the inverter unit 400. The inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, and has the lightweight and inexpensive structure, and in which the inverter unit can be certainly fixed to the battery.

Embodiment 5

Figure 7:
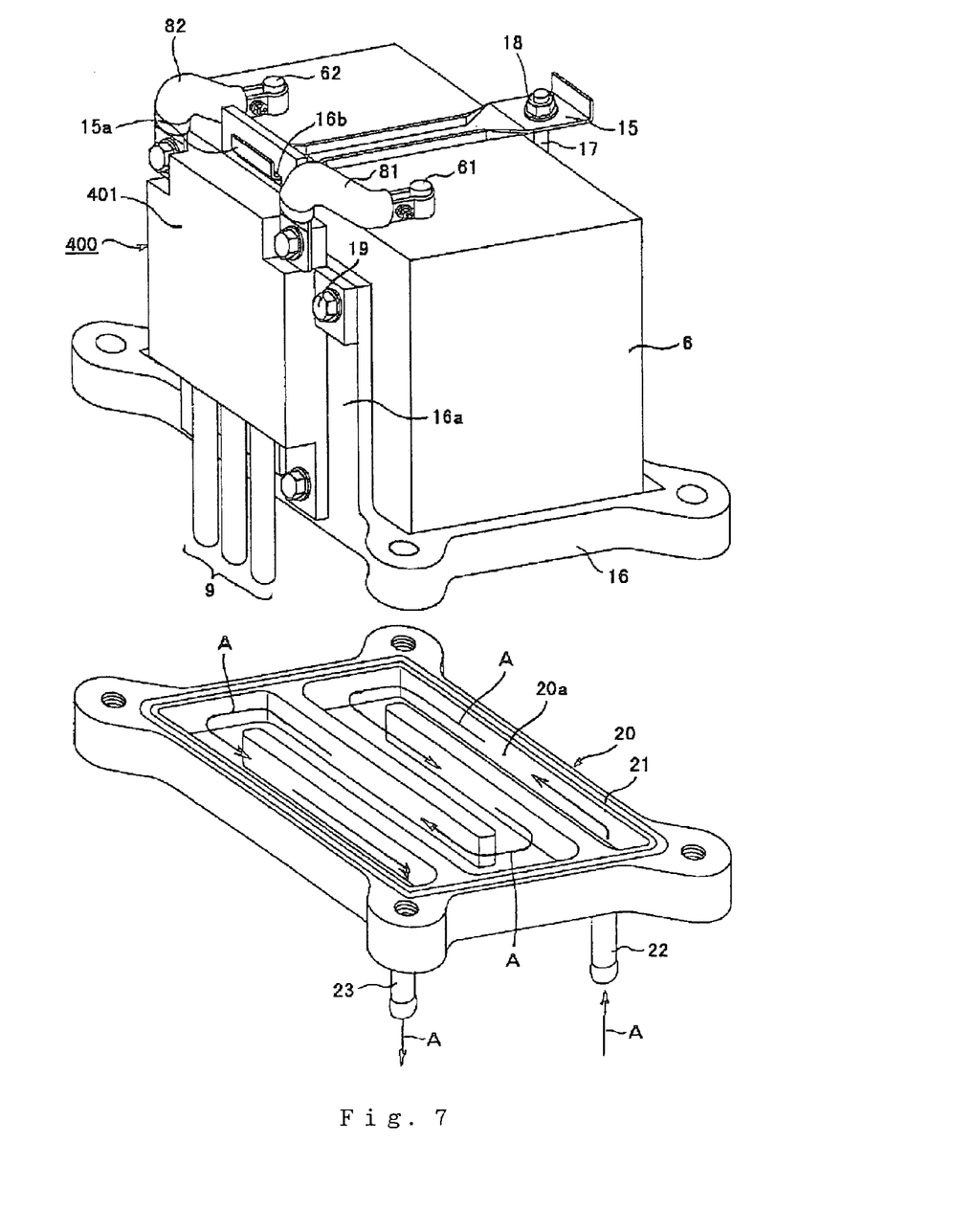
FIG. 7 is a perspective view showing an apparatus structure in embodiment 5 of this invention.

Embodiment 5 of this invention will be described with reference to FIG. 7. FIG. 7 is a perspective view showing a structure of the embodiment 5.

Except for a specific structure described here, the embodiment 5 has the same structure as the structure of the embodiment 1 and the embodiment 4 described before and has the same operation. In the drawing, the same signs denote the same or equivalent portions.

FIG. 7 is a partially exploded view showing an attachment structure of an inverter unit according to the embodiment 5.

In FIG. 7, a battery tray 16 is formed of good heat conduction material such as aluminum, one side end face 16a of the battery tray 16 is high like a wall along a side of a 12V battery 6, and a heat conduction face of an inverter unit 400 is directly attached to the side end face 16a.

Incidentally, in this embodiment 5, a radiating fin of the inverter unit 400 is omitted, and instead of that, the heat conduction surface is formed at the bottom side of an inverter unit main body 401.

Then, the 12V battery 6 is clamped and fixed by a nut 18 through an attachment bolt 17 in such a state that it is held between a battery fixing plate 15 having one L-shaped portion 15a inserted and fixed to a slit-shaped hole 16b provided above the side end face 16a and the bottom of the battery tray 16.

A liquid cooling device 20 is mounted in a liquid-tight state through a seal material 21 such as an O ring at the lower side of the battery tray 16. A cooling liquid is supplied from an inlet pipe 22, flows through a liquid cooling passage 20a provided in the liquid cooling device 20 as indicated by an arrow A, and is discharged from an outlet pipe 23, so that the battery 16 is cooled by this cooling liquid.

Since the battery tray 16 is formed of the good heat conduction material, the heat generated in the inverter unit 400 can be efficiently discharged through the side end face 16a of the battery tray 16 to the liquid cooling device 20, and the 12V battery 6 is also kept at a suitable temperature.

As described above, since the attachment structure of the inverter unit according to this embodiment 5 is such that the inverter unit 400 and the 12V battery 6 are integrally fixed through the battery tray 16 formed of the good heat conduction material, it is possible to simultaneously cool or keep them at a suitable temperature by the one liquid cooling device 20 mounted to the battery tray 16.

This embodiment 5 has structures as set forth in following items (8) and (9), and has operations and effects shown in the items (8) and (9).

(8) The vehicle power supply system as set forth in any one of the items (2) to (7) is characterized in that the cooling function is provided in the housing for holding the battery.

Effects (8A) The cooling function is provided in the housing for holding the battery, so that the inverter unit directly attached to the housing for holding the battery can be efficiently cooled.

(9) The vehicle power supply system as set forth in the item (8) is characterized in that a cooling medium for cooling the battery is identical to a cooling medium for cooling the inverter unit.

Effects (9A) There are effects that the battery and the inverter unit can be simultaneously cooled by the one cooling device, and especially at the time of low temperature, the battery is quickly kept at a suitable temperature by the heat generated by the inverter unit.

According to the embodiment 5 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the DC wiring lines 81 and 82 for connecting the inverter unit 400 and the battery 6, the inverter unit 400 is placed in the vicinity of the battery 6 so that the DC wiring lines 81 and 82 become shorter than the AC wiring line 9, and the cooling function member is provided in the housing for holding the battery. The inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, has the lightweight and inexpensive structure, and can efficiently cool the inverter unit.

Besides, according to the embodiment 5 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the DC wiring lines 81 and 82 for connecting the inverter unit 400 and the battery 6, the inverter unit 400 is placed in the vicinity of the battery 6 so that the DC wiring lines 81 and 82 become shorter than the AC wiring line 9, the cooling function member is provided in the housing for holding the battery, and the cooling medium, such as cooling liquid, for cooling the battery is made identical to the cooling medium for cooling the inverter unit. The inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, has the lightweight and inexpensive structure, and can keep the battery and the inverter unit at a suitable temperature.

Embodiment 6

Figure 8:
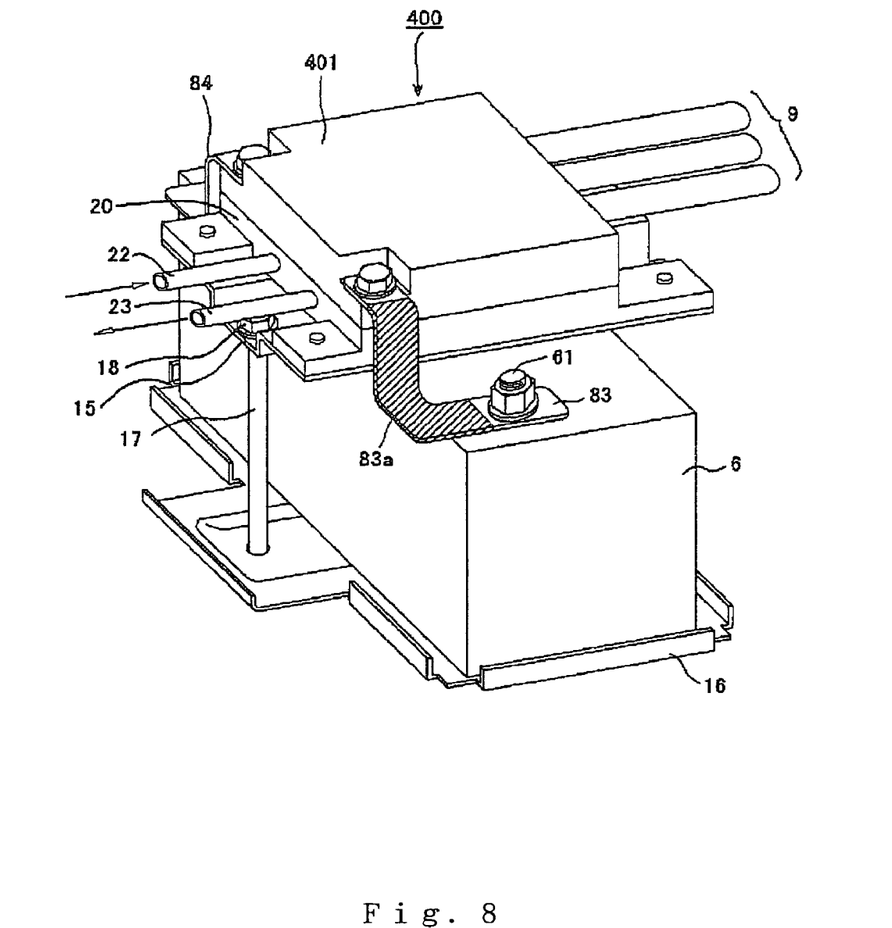
FIG. 8 is a perspective view showing an apparatus structure in embodiment 6 of this invention.

Embodiment 6 according to this invention will be described with reference to FIG. 8. FIG. 8 is a perspective view showing a structure according to the embodiment 6.

Except for a specific structure described here, the embodiment 6 has the same structure as the structure of the embodiment 1 to the embodiment 5 described before and has the same operation. In the drawing, the same signs denote the same or equivalent portions.

In FIG. 8, a liquid cooling device 20 is mounted at the lower side of an inverter unit main body 401 of an inverter unit 400 through a seal member 21 (not shown) in a liquid-tight state. A cooling liquid is supplied from an inlet pipe 22 into the liquid cooling device, flows through a liquid cooling passage 20a (not shown) in the liquid cooling device 20 and is finally discharged from an outlet pipe 23.

As stated above, the liquid cooling device 20 can efficiently cool the heat generated in the inverter unit main body 401.

The integrally fixed inverter unit 400 and the liquid cooling device 20 are screwed to the battery fixing plate 15, this battery fixing plate 15 is clamped and fixed by an attachment bolt 17 and a nut 18 to a battery tray 16 in such a state that a 12V battery 6 is held therebetween, and the battery tray 16 is fixed to a body of a vehicle at a not-shown portion.

Accordingly, the inverter unit 400 fixed integrally with the liquid cooling device 20 is fixed to the body of the vehicle at the upper end face of the 12V battery 6 through the battery fixing plate 15, the attachment bolt 17, the nut 18, the 12V battery 6 and the battery tray 16.

Incidentally, here, a positive terminal 403 provided at the inverter unit main body 401 and a positive terminal 61 of the 12V battery 6 are electrically connected by a positive DC conduction plate 83 as a plate-shaped good conduction member, and similarly, a not-shown negative terminal 404 and a negative terminal 62 are electrically connected by a negative DC conduction plate 84.

As stated above, since the attachment structure of the inverter unit of this embodiment 6 is such that even in the case where the inverter unit 400 is liquid-cooled by the liquid cooling device 20, the inverter unit 400 and the liquid cooling device 20 are integrally and compactly attached to the upper end face of the 12V battery 6, the same effects as the case of the embodiment 1 of FIG. 1 can be obtained.

According to the embodiment 6 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the DC wiring lines 81 and 82 for connecting the inverter unit 400 and the battery 6, the inverter unit 400 is placed in the vicinity of the battery 6 so that the DC wiring lines 81 and 82 become shorter than the AC wiring line 9, the cooling function member is provided in the housing for holding the battery, and the cooling medium for cooling the battery is made identical to the cooling medium for cooling the inverter unit. The inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, and has the lightweight and inexpensive structure.

Embodiment 7

Figure 9:
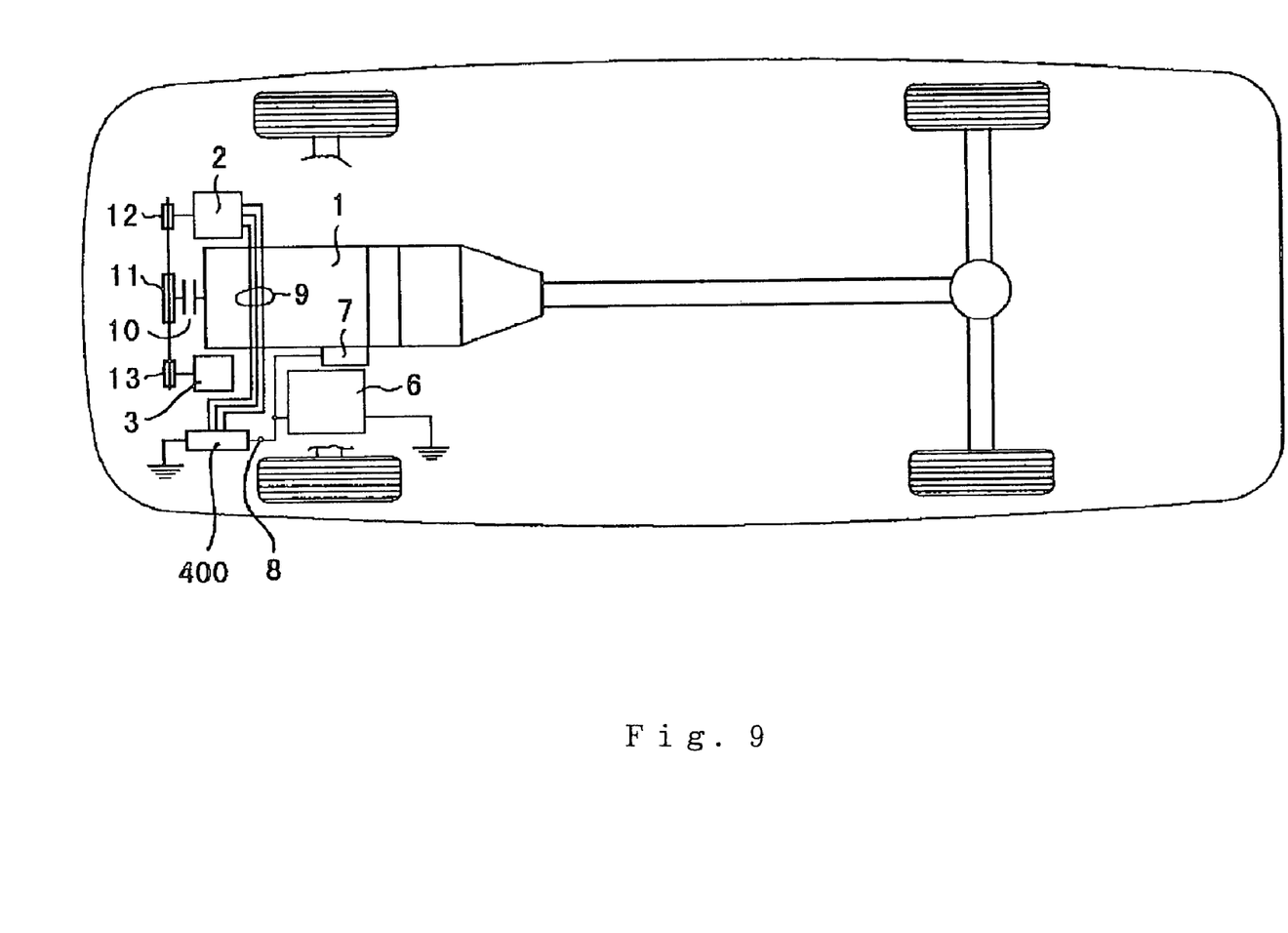
FIG. 9 is a conceptual view showing an arrangement of the whole of a vehicle in embodiment 7 of this invention.

Embodiment 7 of this invention will be described with reference to FIG. 9. FIG. 9 is a conceptual view showing an arrangement relation of an attachment structure of an inverter unit according to the embodiment 7 in the whole of a vehicle.

Although the attachment structure of the inverter unit according to the embodiments 1 to 6 deals with the case where the space for attachment of the inverter unit can be hardly ensured in the vicinity of the battery in the engine room, this invention is not limited to the above condition. For example, in the case where there is an attachment space in the vicinity of the battery, a method may be such that as shown in FIG. 9, an inverter unit 400 is vertically placed and is directly attached to a body of a vehicle so as to occupy as a small attachment space as possible, and also in this case, a DC wiring line 8 for connecting the inverter unit 400 and a 12V battery 6 can be shortened, and similarly to the effects realized in the embodiments 1 to 6, a voltage drop due to the DC wiring line can be suppressed to be small, and eventually, a torque characteristic of a rotating electric machine 2 can be improved.

As stated above, this invention is not limited to the case where there is no space of simultaneous mounting of the battery and the inverter unit in the engine room, and for example, also in the case where there is a space for simultaneous mounting of the battery and the inverter unit in the engine room, this invention provides the attachment structure of the inverter unit in which the attachment position relation of the battery and the inverter unit is limited, so that the output of the rotating electric machine can be improved even when the same battery and the same inverter unit are used.

According to the embodiment 7 of this invention, in the system including the 12V battery 6, the inverter unit 400 for converting the DC electric power of the battery 6 into the AC electric power and supplying it to the rotating electric machine 2 to drive it, the AC wiring line 9 for connecting the rotating electric machine 2 and the inverter unit 400, and the DC wiring line 8 for connecting the inverter unit 400 and the battery 6, the inverter unit 400 is placed in the vicinity of the battery 6 and is attached to the vehicle main body, such as the body of the vehicle, so that the DC wiring line 8 becomes shorter than the AC wiring line 9. The inverter unit is placed in the vicinity of the battery, the DC wiring line between the battery and the inverter unit is shortened, and the voltage drop due to the DC wiring line is reduced, and accordingly, it is possible to obtain the vehicle power supply system which can improve the torque characteristic of the rotating electric machine, and has the lightweight and inexpensive structure.

Incidentally, in the above embodiments 1 to 7, although the description has been given on the assumption that the voltage of the battery in the case where the number of batteries is one is 12 V, this invention is not limited to this, and the invention may be applied to the case where the battery has a voltage higher than 12V.

While the presently preferred embodiments of the present invention have been shown and described.

It is to be understood that these disclosures are for the purpose of illustration and that various changes and modifications may be made without departing from the scope of the invention as set forth in the appended claims.

What is claimed is:

1. A vehicle power supply system comprising:
   a battery;
   an inverter unit for converting DC electric power of the battery into AC electric power and supplying it to a rotating electric machine to drive it;
   an AC wiring line for connecting the rotating electric machine and the inverter unit; and
   a DC wiring line for connecting the inverter unit and the battery,
   wherein the inverter unit is placed in a vicinity of the battery so that the DC wiring line becomes shorter than the AC wiring line;
   wherein an electric connection body for electrically connecting the battery and the inverter unit is a metal plate;
   wherein the metal plate directly connects the battery and the inverter; and
   wherein the inverter unit is attached and fixed, in physical contact with a side of the battery, by the metal plate.

2. The vehicle power supply system according to claim 1, further comprising a liquid cooling device mounted on a lower side of the inverter unit supplying cooling liquid which cools the inverter unit.

* * * * *